United States Patent
Amir

(10) Patent No.: US 11,750,759 B2
(45) Date of Patent: Sep. 5, 2023

(54) GREYSCALE IMAGES

(71) Applicant: Hewlett-Packard Development Company, L.P., Spring, TX (US)

(72) Inventor: Gideon Amir, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/758,764

(22) PCT Filed: Jan. 30, 2020

(86) PCT No.: PCT/US2020/015906
§ 371 (c)(1),
(2) Date: Jul. 13, 2022

(87) PCT Pub. No.: WO2021/154265
PCT Pub. Date: Aug. 5, 2021

(65) Prior Publication Data
US 2023/0069685 A1    Mar. 2, 2023

(51) Int. Cl.
*H04N 1/405*    (2006.01)
*G06V 10/50*    (2022.01)
*G06V 10/75*    (2022.01)
*G06V 10/74*    (2022.01)

(52) U.S. Cl.
CPC .......... *H04N 1/405* (2013.01); *G06V 10/507* (2022.01); *G06V 10/751* (2022.01); *G06V 10/761* (2022.01)

(58) Field of Classification Search
CPC .... H04N 1/405; G06V 10/761; G06V 10/751; G06V 10/507
See application file for complete search history.

(56) References Cited

U.S. PATENT DOCUMENTS

| | | | |
|---|---|---|---|
| 7,009,736 B2 | 3/2006 | Thakur | |
| 7,471,421 B2 | 12/2008 | Asai et al. | |
| 7,513,589 B2 | 4/2009 | Eldar et al. | |
| 7,782,493 B2 | 8/2010 | Asai et al. | |
| 8,243,332 B2 | 8/2012 | Yoshida | |
| 8,600,147 B2 | 12/2013 | Iliopoulos et al. | |
| 9,264,568 B1 * | 2/2016 | Aikawa | H04N 1/028 |
| 9,819,828 B2 | 11/2017 | Stevens | |
| 9,990,686 B2 | 6/2018 | Chen et al. | |
| 2005/0135673 A1 * | 6/2005 | Mantell | H04N 1/52 382/162 |

* cited by examiner

*Primary Examiner* — Quang N Vo

(57) ABSTRACT

In an example, a method includes, by one or more processors, acquiring a dot pattern having a distribution of dots. A greyscale image comprising a plurality of pixels each associated with a greyscale value may be derived from the dot pattern. Deriving the greyscale image may comprise, for each pixel, determining the closest dot to the pixel and associating a distance of the closest dot from the pixel with the pixel, and assigning a greyscale value to each pixel, wherein the greyscale value is based on the distance associated with that pixel.

15 Claims, 5 Drawing Sheets

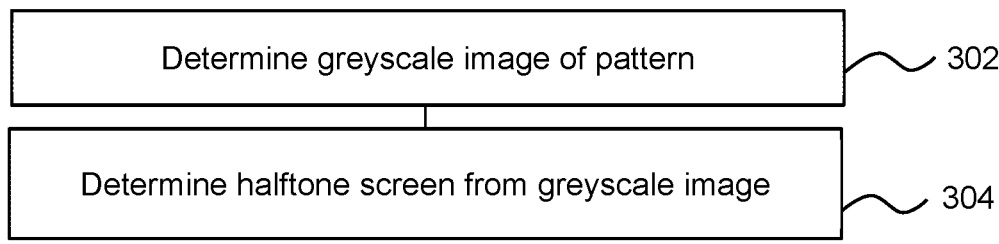
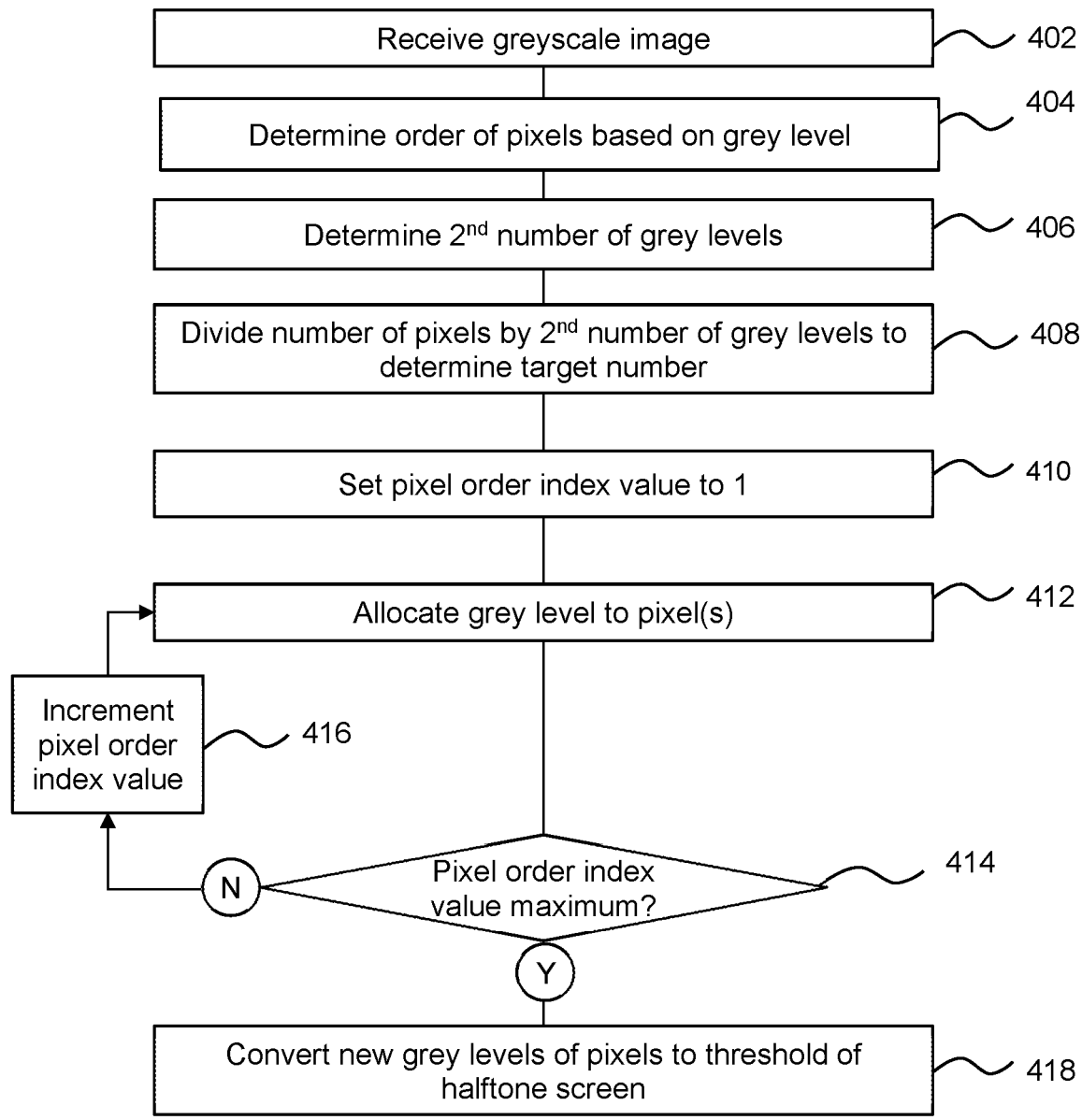

GREYSCALE IMAGES

BACKGROUND

Greyscale images represent images by defining a plurality of shades of at least one color.

BRIEF DESCRIPTION OF DRAWINGS

For a more complete understanding, reference is now made to the following description taken in conjunction with the accompanying drawings in which:

FIG. 3 is a flowchart of an example of a method of determining a halftone screen;

FIG. 4 is a flowchart of an example of a method of converting a greyscale image to a halftone screen;

DETAILED DESCRIPTION

Examples herein relate to producing a greyscale image from an underlying pattern. The pattern may comprise, for example, point locations which may be referred to herein as 'dots'. The method may, in some examples, be used in the creation of halftone screens, which may in turn be used when applying print agents such as ink to a substrate.

Figure 1:
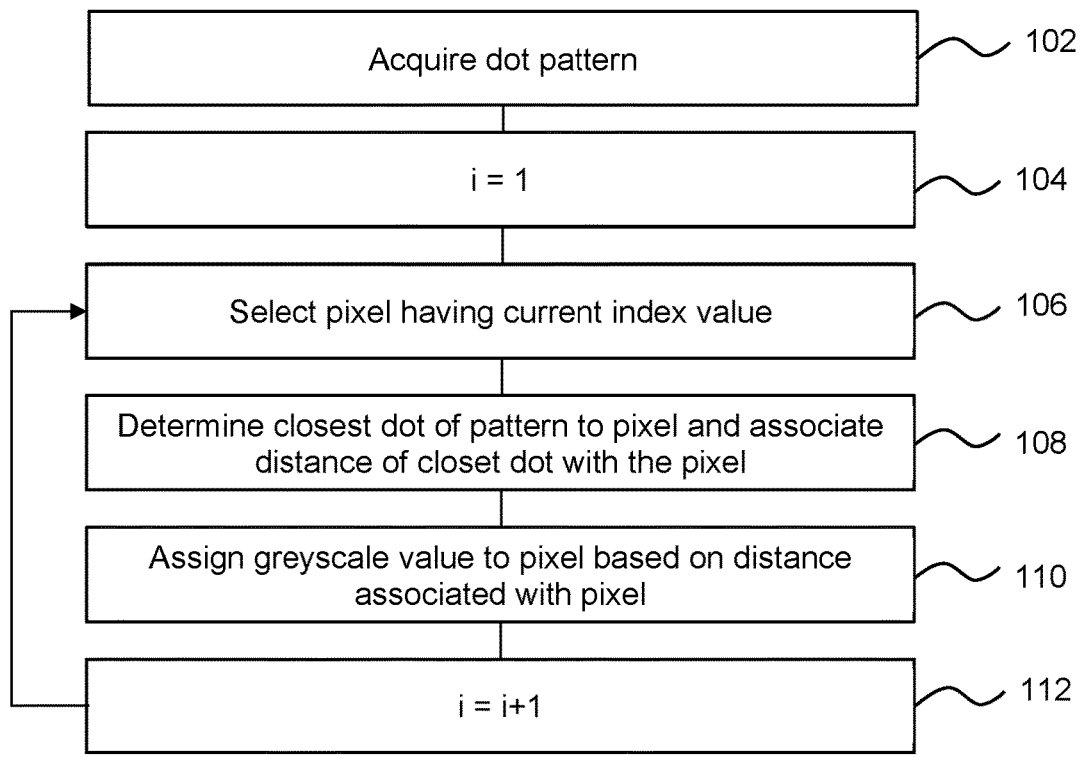
FIG. 1 is a flowchart of an example of a method of determining a greyscale image from a dot pattern.

FIG. 1 is an example of a method, which may be a computer implemented method of determining a greyscale image from a pattern. In this example the method is carried out by at least one processor, and comprises, in block 102, acquiring a dot pattern having a distribution of dots. The dots may for example be point locations, for example coordinates having floating point values. Therefore, the pattern could be described as a point pattern having a distribution of points. Acquiring the dot/point pattern may for example comprise receiving the pattern from a memory (for example, this may be a pattern created by a designer or the like), determining the pattern on an algorithmic basis, or the like.

Blocks 104 to 112 describe a method for deriving, from the pattern, a greyscale image comprising a plurality of pixels each associated with a greyscale value (which may also be referred to as a grey level).

Block 104 comprises setting an index value, i, to 1 and, in block 104, selecting the pixel having the current index value of 1. The pixel is a pixel intended to be defined in the greyscale image, and is selected from a pixel grid aligned with the pattern.

In this example, the pattern is a tiled pattern, i.e. comprises a repeating 'tile'. The dot pattern may be represented as a tile size and a list of dot-centre, or point positions (x, y) within the tile, were x, y can be floating point numbers. This can be 'tiled' to form the repeating pattern.

Block 108 comprises determining the closest dot/point of the pattern to the pixel and associating a distance of the closest dot/point from the pixel with the pixel. For example, there may be a plurality of relatively close dots, and the closest of these is selected. The distance may for example be measured from the centre of the pixel to a dot, although in principle any reference point location on the pixel/dot may be used (given that the same reference point location may be used for each pixel). In some examples, the distance may be determined as a floating point number measured in terms of pixels. Note, in a tiled design, it may be the case that the closest dot is on an adjacent tile to the pixel rather than the same tile. It may be noted that, where the dots or points are relatively close to one another, the greyscale image may comprise lines.

Block 110 comprises assigning a greyscale value to the pixel based on the distance associated with that pixel. In some examples, the greyscale value may be proportional to the distance. In some examples, the distances may be normalised based on the maximum distance between a pixel such that the pixel having the greatest distance to its closest dot may be assigned the maximum greyscale value. For example, if the highest greyscale value is between 0 and 255, then 255 may be assigned to the pixel having the greatest distance to its closest dot, and 0 may be assigned to a distance of 0 (e.g. the dot coincides with the centre of the pixel). The greyscale values may be integer values (for example having been rounded) although they may in principle be floating point values. In this example, 0 in greyscale may be taken to be black whereas 255 is white. In other examples, the greyscale values may be converted into halftone thresholds. Where this is the case, the assigned greyscale values may be strictly between 0 and 255, and the absolute values of 0 and 255 may not be assigned, as these values may result in pixels being, in effect, 'always on' or 'always off', regardless of image data.

In block 112, the index number is incremented, and the method then loops back to block 106 for the new pixel.

In this way, a greyscale image based on the dot pattern may be determined. The dot pattern may be defined in a light-weight manner (e.g. using just one tile for a tiled design).

Figure 2A:
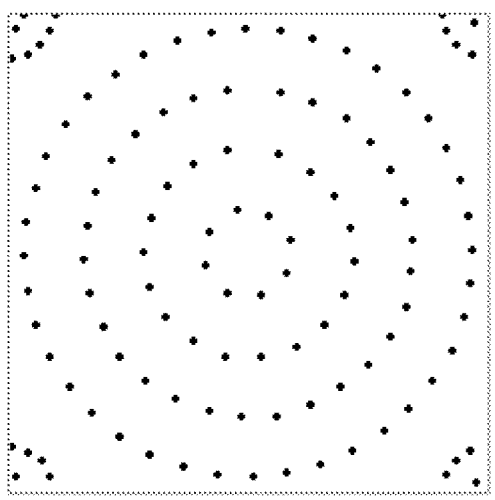
FIGS. 2A and 2B show an example of a dot pattern
Figure 2B:
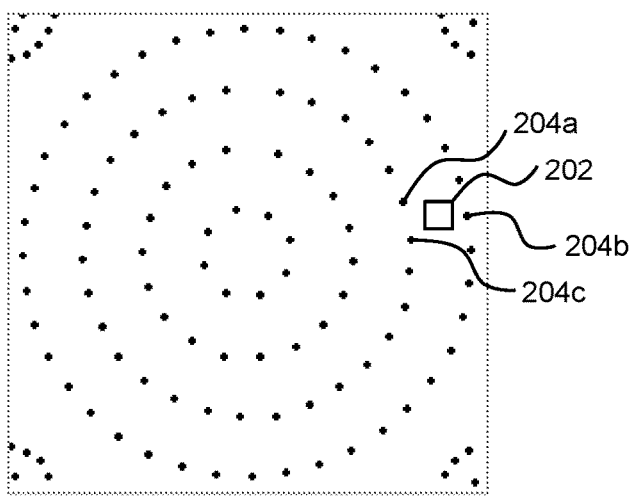

FIG. 2A shows a tile of a dot pattern (or point pattern) which may be represented, for example as a size and a set of dot locations within the tile. The dot locations may for example be proportional to the tile size (for example, having an x and y location between 0 and 1, wherein the location may be a floating point number). In another example, the dot locations may be described algorithmically FIG. 2B shows a pixel 202 superimposed on a tiled pattern based thereon. The three closest dots 204*a-c* from the centre of the pixel 202 are indicated, and the closest of these is used to provide the distance which is associated with the pixel 202 as described in block 108 above. This distance may be converted into a greyscale value as described in relation to block 110.

Figure 2C:
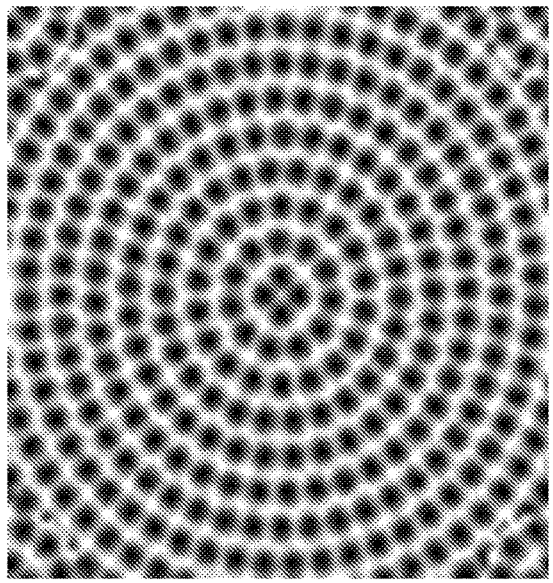
FIG. 2C shows an example of a greyscale image derived from a dot pattern.
Figure 2D:
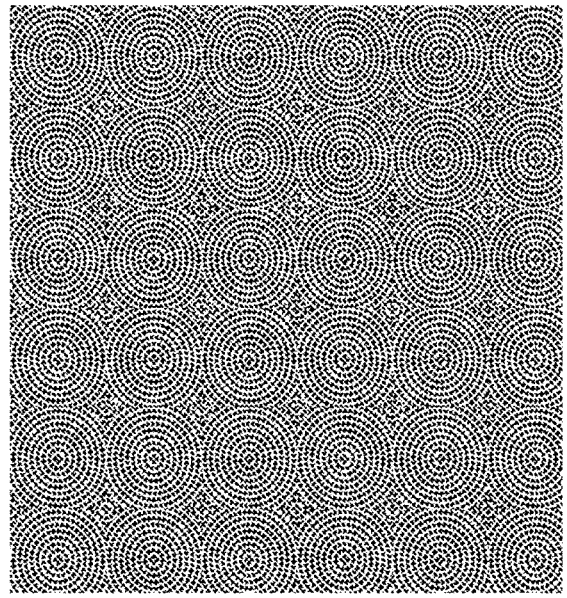
FIG. 2D shows an example of a tiled greyscale image.

FIG. 2C shows a representation of a portion (a tile) of a greyscale image which may be converted into a halftone screen. (which in this example is a different dot pattern from that shown in FIGS. 2A and 2B, albeit similar in form). In this example, a high grey level, or greyscale value is indicated as a light color and a low grey level is indicated as a darker color. As can be seen, in this example, the dot pattern has formed distinct spots in the greyscale image. However, in other examples the dots may be sufficiently close to one another so as to 'merge' on conversion to a grey scale image and form a line. FIG. 2D shows a tiled version of this image.

Therefore, from a data representation of a dot pattern, which may be small in size and therefore require little by way of computer memory storage space, a greyscale image may be produced in a simple and repeatable manner. In some examples, this may allow high resolution graphics to be produced in a deterministic manner from a small file size. The produced greyscale images may, in some examples, be used in creation of halftone screens.

As mentioned above, in some examples, the greyscale image may be used as the basis of a halftone screen. To consider such an example, printing methods are now briefly discussed.

In the case of two-dimensional printing, a print addressable location may be modelled by at least one pixel, and each print addressable location may be printed with at least one colorant such as inks (for example cyan, magenta, yellow and black inks), coatings or other print materials, as well as combinations of those print materials.

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may comprise at least one voxel and each voxel may be 'printed' i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent which absorbs energy onto a layer of the build material. Energy may be applied to the layer and the build material on which an agent has been applied may coalesce and solidify upon cooling. In other examples, directed energy may be used to selectively cause coalescence of build material, or binding agents may be used to selectively solidify a build material. In other examples, three-dimensional objects may be generated by using extruded plastics or sprayed materials as build materials, which solidify to form an object.

Some processes that generate or print three-dimensional objects use control data or print instructions generated from a model of a three-dimensional object. This control data may, for example, specify the locations at which to apply an agent to the build material, or where a build material itself may be placed, and the amounts to be placed. Halftone screens may be used to determine where to place drops of agents (for example, agents which absorb energy, binding agents and/or colorants).

In examples of halftone screens, it may be intended to avoid patterns associated with the screen appearing in the printed output. For example, a 'moiré' pattern may be seen where clusters of dots repeat or, in the case of printing multiple colors (which may be printed in separate layers, or 'separations'), dots from one color may visually interfere with dots printed in another color. Such patterns may be seen to detract from image quality. Halftone screens may be designed to avoid such patterns appearing in printed outputs, or to minimise their occurrence or impact. However, in examples herein, halftone screens may be designed to include a pattern based on the dot pattern.

In some examples, the halftone screens may be defined at a resolution which is higher than the intended print resolution. For example, while the print resolution may be around 800 dpi, a halftone screen may be defined at around 2400 dpi. This relatively higher resolution may allow the halftone thresholds to be defined to provide a reasonable number of lines per inch (lpi), in turn allowing fine lines to be reproduced. A print resolution of around 800 dpi allows for a relatively compact image in terms of data storage. As is further set out below, as halftone screens may be tiled (i.e. made up of a number of replicated or repeated tiles), this may also provide a relatively compact image despite the higher resolution.

In some examples, the greyscale images may be used to provide threshold values for halftoning. For example, FIGS. 2C and 2D may in effect show a representation of the halftone pattern wherein a high threshold value in the halftone screen is indicated as a light color and a low threshold is indicated as a darker color. In practice, this would be an array of threshold values, for example distributed between 0 and 1, or having the same value spread as pixel values in image data. In use (in a simple case—amplitude modulation and frequency modulation are further discussed below), when a pixel value is compared to a threshold value, print agent may be applied to a location corresponding to the pixel if the pixel value is above the threshold and not otherwise. Therefore, low thresholds (black regions) will usually be associated with placement of print agent unless there is a void in the image data at this point (for example a blank portion of the image). High thresholds may be associated with a low probably of placement of print agent, even where image data is present. Therefore, the pattern may be encoded in the distribution of threshold values.

Figure 2E:
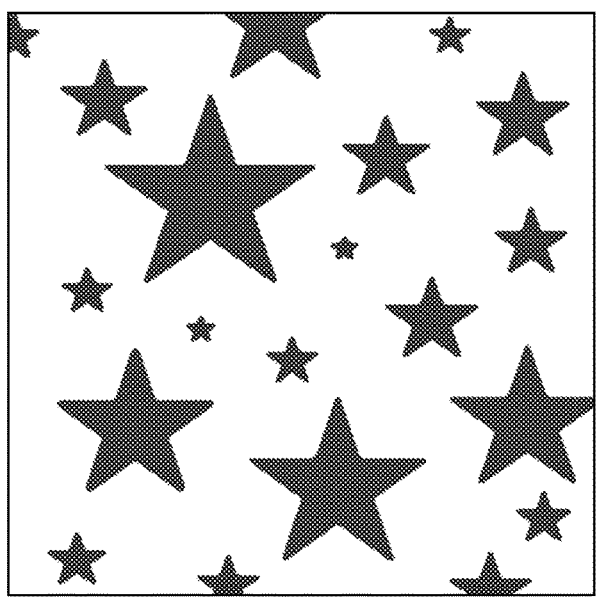
FIG. 2E shows a representation of example image data.
Figure 2F:
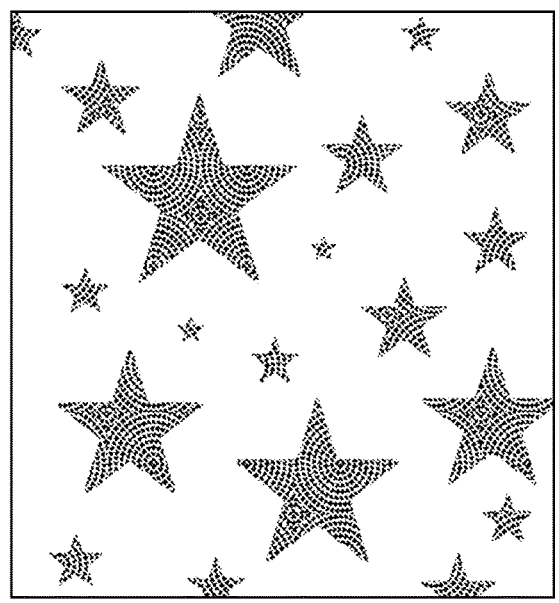
FIG. 2F shows an example of a printed output of an image having been halftoned using a halftone screen derived from a greyscale image.

FIG. 2E shows a representation of image data, which in this example is a relatively simple image, but in other examples may for example be a more complex image. FIG. 2F shows an example of this image data having been halftoned using a halftone screen based on the tiled greyscale image shown in FIG. 2D, and may provide a representation of a printed output. As can be seen, the image derived from a dot pattern may be seen in the image FIG. 3 is an example of a method of determining a halftone screen according to one example of the present invention, which may be implemented, at least in part, by one or more processors. The halftone screen may have one or more repeating elements, for example, being 'tiled'.

Block 302 comprises determining, by at least one processor, a greyscale image of a pattern as set out in FIG. 1.

Block 304 comprises determining, by at least one processor (which may be the same or a different processor to that described in relation to block 302), a halftone screen from the greyscale image based on the grey levels (or greyscale values) of pixels of the greyscale image. For example, this may comprise converting, by at least one processor, the greyscale image to a halftone screen comprising a matrix of threshold values. For example, the greyscale values of the pixel array of the greyscale image may be converted to halftone thresholds of the pixel array of a halftone screen. The conversion may be a proportional conversion, for example the threshold values may be proportional to the halftone values. Other examples are discussed below.

In some examples, the method further comprises processing circuitry, which may for example be processing circuitry of a print apparatus, applying the halftone screen to image data to determine print instructions, and printing an image based thereon. Applying the halftone screen to image data may comprise associating at least one pixel of the halftone screen with a pixel of the image data, comparing an image pixel value with the threshold value of the or each halftone screen pixel, and determining print instructions (which may for example be binary and/or include a number or size of print agent dots) for each image pixel accordingly). In some examples, the halftone screen comprises a plurality of duplicated 'tiles', or else the print apparatus may use each halftone screen in a tiled manner.

Such print apparatus may for example comprise print apparatus components such as print head(s), at least one print agent supply, and the like. Where the print apparatus is a 'two dimensional' printer, it may for example comprise a laser printer or an inkjet printer or the like, and may comprise a print head, substrate handling systems, sources of inks or toner, and the like. Where the printer is a 'three dimensional' printer, it may comprise, or be associated with, a print bed, a fabrication chamber, a print head, at least one energy source, a source of build material, or the like.

This may allow a pattern to be embedded in an image. For example, the dot pattern may be indicative of company logo, and the greyscale image created therefrom may look similar to the company logo. By embedding the logo into a halftone screen, it may be superimposed on an image, for example appearing as a watermark. The pattern may be repeated or tiled as mentioned above. For example, this may allow an image to bear multiple copies of a company logo, from a starting point of a small file having a dot pattern.

The method comprises, in block 402, receiving a greyscale image having a plurality of pixels, each pixel being associated with a grey level (i.e. a greyscale value within the first number of grey levels), and the greyscale image having a first number of grey levels. For example, the greyscale image may be an image having 256 grey levels, wherein black is designated as 0 and white is designated as 255.

Block 404 comprises determining an order of the pixels based on their grey levels. In particular, the order may arrange the pixels in the order of the magnitude of the grey level, starting from the lowest grey level and ending with the highest grey level. In this example, pixels having the same level are grouped. In other words, considering five pixels P1-P5 having the grey values of P1: 60, P2: 40, P3: 80, P4: 60 and P5: 120, these may be re-ordered as P2, {P1, P4}, P3, P5. Of course, in practice, there may be many more pixels to order. The order within the group(s) of pixels having the same value (indicated by the curly brackets { . . . } above) may be determined, for example randomly, based on the pixel index, or in some other way (for example, based on a spatial distribution).

Block 406 comprises determining a second number of grey levels, wherein the second number of grey levels is greater than the first number. For example, as mentioned above, the first number maybe 256 (values from 0 to 255), as this scale is often used in greyscale images. However, to provide enough levels for accurate color calibration and linearization of the grey levels, the second number of grey levels may be around 750 (for example, to accurately map from an intended color to a print instruction given that the optical density/visual perception of a color does not always vary linearly with print agent amount). As further explained below, this may initially be an approximate target number.

Block 408 comprises determining an indication of a target number of pixels per grey level, in this example by dividing the number of pixels in the greyscale image by the second number of grey levels. For example, for a 72 by 72 pixel image, there are a total of 5184 pixels. If the second number of grey levels is to be around 750, then if the pixels are to be evenly distributed among the grey levels there may be 5184/750=6.9 pixels per grey level. As this is not a whole number, it may be rounded down to six. In this case as the number has been rounded down, there may be more than 750 grey levels for linearization/calibration. Therefore, in some examples, any floating point number may be rounded down. However, in practice, there may be fewer than 750 grey levels without undue visual impact when the halftone screen is applied to image data in due course. In other examples, as is set out below, the target number of pixels per grey level may not be a whole number of pixels. For example, the target number may be based on an integer number of sub-pixels, where the number of sub-pixels per grey level is not equal to a multiple of the number of sub-pixels per pixel. In this example, it may be noted that the second number of grey levels could therefore be defined as 5184/6=864 grey levels. In other words, the second number of grey levels may be initially defined as an approximate target, then redefined once the number of pixels per grey level to provide a number of grey levels in the region of the target number of grey levels is known.

Block 410 comprises setting a pixel order index value to 1. Then, taking the first pixel in the order determined in block 404, and the grey levels in order of increasing magnitude (i.e. starting with the lowest grey level), the method proceeds by allocating a grey level to the pixel of the pixel order index in block 412, before (unless the pixel order index value is the maximum value, as determined in block 414) incrementing the pixel order index value by one in block 416 and looping back to block 404 to provide the determined target number of pixels per grey level. In other words, after the target number of pixels is allocated a particular grey level, the grey level is incremented.

Thus, in the example above, the first six pixels of the order (i.e. the pixels with the lowest pixel index in the ordered list of pixels, corresponding to pixels of low greyscale values/grey level) will be allocated the lowest grey level. The next six will be allocated the second lowest grey level, and so on. In other words, the pixels may be at least substantially evenly distributed over the grey levels of the second number of grey levels.

Once the method has worked through the ordered list of pixels, the condition set out in block 414, i.e. that the pixel order index value is the maximum value, is met, and the method proceeds to block 418, which comprises converting the new grey levels of each pixel to thresholds of a halftone screen.

For example, this may comprise a proportional conversion, wherein the threshold may be between 0 and 1 (between meaning in this example not equal to). Therefore, each determined threshold may have a value which is the grey level value of that pixel divided by the maximum value plus 1. This may be scaled to the image values of the pixel, or vice versa, for halftoning. In other examples to avoid the thresholds of 0 or 1, the maximum grey level and a grey level of 0 may not be assigned when assigning grey levels.

Such a halftone screen may be of use in processing image data for printing, wherein aspects of the halftone screen may be apparent in the printed output. For example, if the greyscale image comprises a pattern with light and dark areas, such a pattern may be discernible in the printed output, for example as shown in FIG. 2F. For example, the greyscale image may be indicative of a company logo. By embedding the logo into a halftone screen, it may be superimposed on an image, for example appearing as a watermark. The pattern may be repeated or tiled as mentioned above.

The method of FIG. 1 may therefore further comprise applying, by at least one processor, the halftone screen to image data to determine print instructions for printing the image. In some example, the method may further comprise printing an image, for example using a printing apparatus.

For example, a printer operator may apply the halftone screen to image data to determine print instructions, and print an image based thereon. Applying the halftone screen to image data may comprise associating at least one pixel of the screen with a pixel of the image data, comparing an image pixel value with the threshold value of the or each halftone screen pixel, and determining print instructions for each image pixel accordingly. In some examples, when a pixel value is compared to a threshold value, print agent may be applied to a location corresponding to the pixel if the pixel value is above the threshold and not otherwise. Therefore, a low threshold (black regions) will usually be associated with placement of print agent unless there is a void in the image data at this point (for example a blank portion of the image). However, a high threshold will usually be associated with no placement of print agent, even if an image is present at this point. In other examples, a number and/or size of print agent drops to be applied to a location may be determined, for example based on the threshold values of sub-pixels within a pixel, but a similar result may be seen. As noted above, in some examples, the halftone screen comprises a plurality of duplicated 'tiles', or else the print apparatus may use each halftone screen in a tiled manner.

The printed image may therefore have, at least to an extent, the greyscale image embedded therein.

Figure 5:
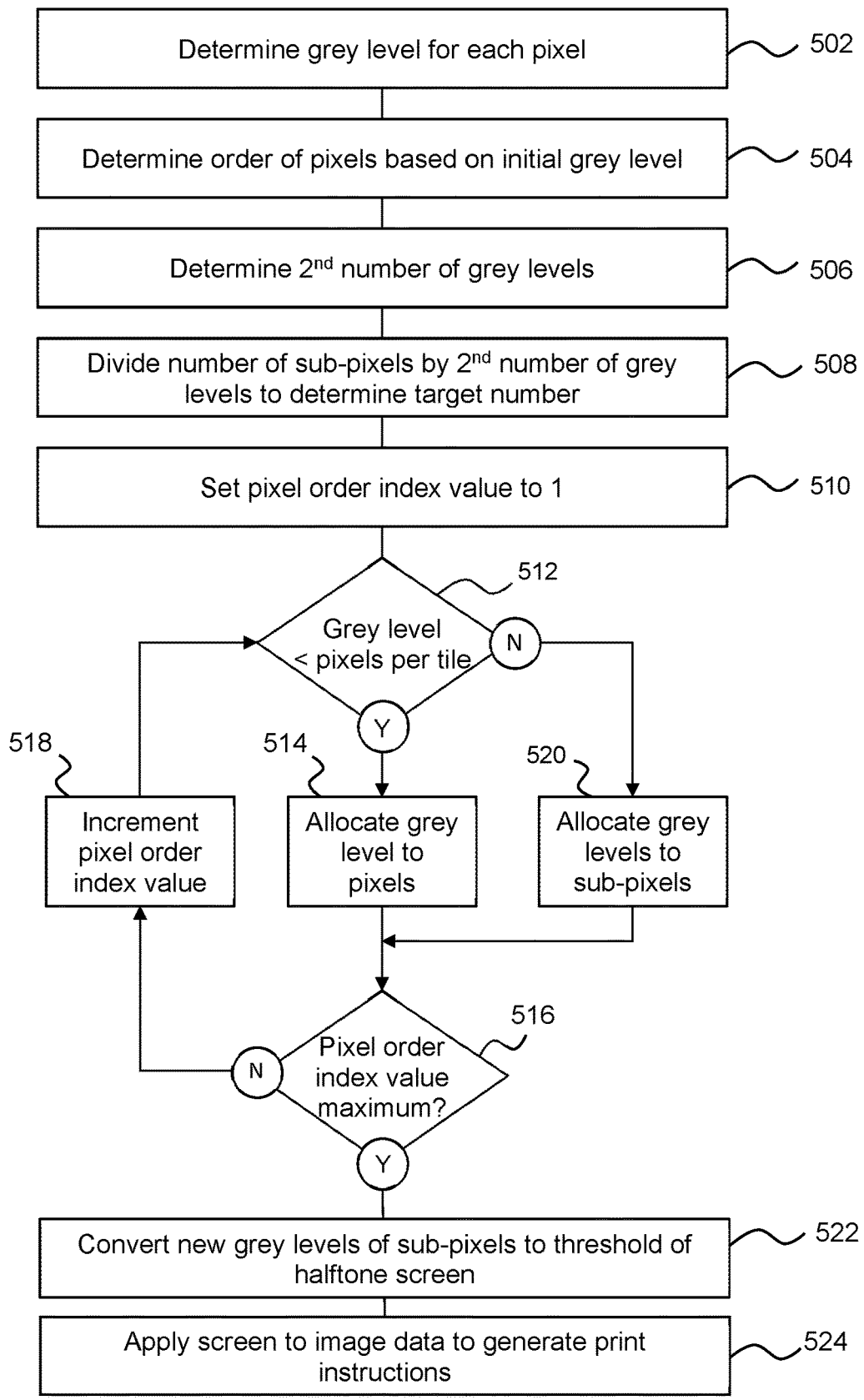
FIG. 5 is a flowchart of another example of a method of converting a greyscale image to a halftone screen.

FIG. 5 is another example of a method, which may comprise a computer implemented method implemented by one or more processors, of converting a greyscale image to a halftone screen, and may comprise an example of the method set out in FIG. 4. In this example, each pixel of the greyscale image comprises a plurality of sub-pixels. When converted to a halftone threshold screen, each pixel may correspond to a print addressable region. Looked at another way, the pixels of the greyscale image are grouped into sets of sub-pixels, each set of sub-pixels forming one image/print resolution pixel. In practice, this may be a tiled greyscale image.

The sub-pixels may define the size and/or number of drops or dots of print agent applied to a print addressable location. Taking the size of the dot/drop, this may be referred to as amplitude modulation. There may for example be three sub-pixels in a pixel, each having a threshold value.

In another example, there may be a square number of sub-pixels per print pixel. For example, where the resolution at which the halftone screen is to be defined is 2400 dpi and the image is to be printed at 800 dpi, there may be nine sub-pixels per pixel (as 2400/800=nine greyscale image values per image pixel).

In use of a halftone matrix derived from the greyscale image having three sub-pixels per pixel, a corresponding pixel in image data may be compared to the thresholds. If the image pixel value does not exceed any of the thresholds, then no print agent is deposited. If one threshold is exceeded, a small dot is provided. If two thresholds are exceeded, a medium sized dot is provided and if all three are exceeded, a larger dot is provided. In practice, different dot sizes may be provided by varying a laser power in laser printing, or varying a thermal resistor power in inkjet printing, or the like.

In block 502, a grey level for each pixel is determined, referred to herein after as an initial grey level, the initial grey level being the average of the grey levels of the sub-pixels of that pixel. Thus, taking the example of a pixel comprising three sub-pixels having values 40, 60 and 80, the average value, and the initial grey value, is 60.

Block 504 comprises determining an order of the pixels based on the initial grey level, wherein pixels having the same level are grouped. This may be carried out substantially as set out in relation to block 404 above.

Block 506 comprises determining a second number of grey levels, and may be carried out as described in relation to block 406.

Block 508 comprises dividing the number of sub-pixels in the greyscale image by an estimate of the second number of grey levels to determine a target number of sub-pixels per grey level. As will be apparent from the discussions which follow, determining the target number of sub-pixels per grey level also provides an indication of the target number of pixels per grey level, as there is a predetermined relationship between the number of sub-pixels and the number of pixels.

For example, for a 36 by 36 pixel image, each pixel having three sub-pixels, there are a total of 3888 sub-pixels, with a second number of grey levels as 750. Dividing 3888 by 750 gives 5.2 sub-pixels per grey level. As this is not a whole number, it may be rounded to 5 to ease subsequent processing (as only whole sub-pixels may be associated with a grey value). In this case as the number has been rounded down, there will be more than 750 grey levels for linearization/calibration. Therefore, in some examples, any floating point number may be rounded down. However, in practice, there may be fewer than 750 grey levels without undue visual impact when applying the halftone screen. It may be noted that five sub-pixels could also be expressed as 1.66667 pixels per grey level. As noted above, this may be used to define the second number of grey levels. In this example 3888/5=777.6, and therefore the second number of grey levels may be 778.

Block 510 comprises setting a pixel order index value to 1.

In this example, the method proceeds in a first manner until a threshold number of grey levels is reached, which in this example, is equal to the number of pixels in a tile divided by the number of pixels which make up a line of an intended line per inch resolution To discuss this in a little more detail, in some examples, in addition to dots per inch (dpi), there is another resolution at which images may be considered—that of 'lines per inch', or lpi. This may be a measure of how closely spaced dots of a halftone grid may be. Higher values of lpi are associated with higher quality of images. The target line per inch may be achieved by assigning more than one image pixel for each dot. For example, assuming that a target lpi is 200 (which provides a reasonably good representation of print agent dot density (dots per area) in images), and the intended print resolution is 800 dpi, this implies that each line may be made up of 'super pixels', or 16 (4×4) image pixels.

This in turn defines the number of dots in a tile of an image. For example, returning to the 36 by 36 pixel image, this provides 81 ((36×36)/(4×4)=81) dots (or 'super pixels') for this image.

The size of each dot can be changed from a minimum of one pixel, to a size of several pixels (and sub-pixels). To consider an example in the context of amplitude modulation (higher grey levels may result in larger print agent dots being placed), a first non-zero grey level may be represented as a single-pixel (a dot of a size of one pixel) or alternatively, a dot with the minimum amount of ink accessible for that printer. The next grey level has two single-pixels printed, and so on. Once all the single-pixels of a tile are populated (for example, all 81 in the example above), then a first super pixel may be associated with a larger ink drop to generate a darker shade. In the above example one single pixel was added per each grey level. It is also possible to add several pixels at each grey level (and indeed a different number of pixels may be added for each level) for adding the intended ink amount for each level, and this may have an impact on the threshold number of grey levels.

In the above example, for the first 81 grey levels, there is no amplitude modulation. As a result, all the sub-pixels of a pixel will have a common value. However, for higher values, some pixels may be associated with greater amounts of print agent, and therefore the sub-pixels of a single pixel may have different values to one another.

Therefore, in a first loop of the method, it is determined if the grey level is less than the number of super pixels in a tile (block 512). If so, taking the first pixel in the order determined in block 504, the method proceeds by allocating a new grey level to the sub-pixels of the pixel index in block 514, to provide, on average, the determined target number of sub-pixels per grey level.

As will be appreciated, if the values of the sub-pixels are to be the same, unless the number of sub-pixels is an integer multiple of the number of sub-pixels per grey level, it may not be possible to allocate grey levels to pixels such that each grey level is associated with the same number of sub-pixels. Considering the example above, in which there are three sub-pixels per pixel and five sub-pixel per grey level, the method may start by selecting the pixel with the lowest initial greyscale value (which it may be recalled is the average of its initial sub-pixel grey values). This first pixel may be associated with the lowest grey level of the second number of grey levels, giving three sub-pixels out of a target five sub-pixels. As this is below the intended number, the next pixel in the order determined in block 504 may also be associated with that same lowest grey level, but now the target has been overshot, with six sub-pixels being associated with the first grey-level. However, six is closer to the target five than three. The next grey level may then be selected and associated with the third pixel in the order. However, if the fourth pixel was also associated with this grey level, then the average would trend away from five, so in this case, just one pixel (three sub-pixels) is associated with the second grey level.

The method therefore continues, alternating between allocating 'too many' sub-pixels to a level and 'too few' to the next level, although in other examples other techniques, such as error diffusion techniques may be used to determine the number of sub-pixels to be assigned to any one grey level, until a number of sub-pixels which is equal to an integer multiple of the target number of sub-pixels per grey level is reached. In the above example, this occurs after three levels—two pixels having been allocated to the first grey level or (greyscale value of the second number of grey levels), one to the second and two to the third grey level—such that 15 sub-pixels have been allocated a new grey level, with an average of five per level. The pattern of 2-1-2 may then be repeated. While in this example, an alternating method was used, in other examples other techniques, such as error diffusion techniques may be used to determine the number of sub-pixels to be assigned to any one grey level.

Once the number of grey levels reaches the threshold of the number of super pixels in a tile (in the above example, once 81 grey levels have been allocated), the determination in block 512 is negative, so the method exits the first loop and, assuming that all pixels have not been associated with a grey level, (block 516), proceeds to a second loop. In the second loop, the sub-pixels of a single pixel may be allocated different grey levels in block 520. Therefore, in this example, the exact number of sub-pixels may be allocated to each grey level, e.g. in the case of pixels having three sub-pixels, where five sub-pixels are assigned a grey level, a single grey level may be assigned across two or three pixels.

The method then increments the index order number (block 518) before looping back to block 512. The method continues until it is determined that all pixels have been assigned a grey level (i.e. the maximum number of grey levels have been assigned) (block 516). At that point, the method proceeds to block 522 which comprises converting the new grey levels of each pixel to a threshold of a halftone screen, for example as set out in block 418 above.

Block 524 comprises applying, by at least one processor, the halftone screen to image data to determine print instructions for printing the image. Applying the threshold matrix to image data comprises comparing an image data value for a pixel to each of the threshold values of the sub-pixels of a corresponding pixel of the halftone screen; and determining an amount of print agent to be applied to a location on the substrate corresponding to that pixel based on how many of the threshold values are exceeded by an image data value.

In some examples, the method may further comprise printing an image, for example using a printing apparatus.

Figure 6:
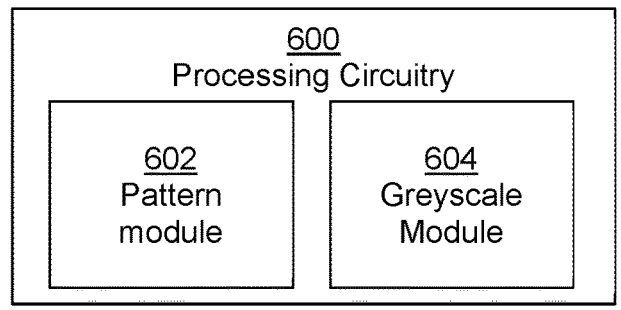
FIGS. 6 and 7 are simplified schematic drawings of example processing circuitry.

FIG. 6 is an example of processing circuitry 600 comprising a pattern module 602 and a greyscale module 604.

The pattern module 602 is, in use of the processing circuitry 600, to determine a dot pattern (or point pattern) having a repeated sub-pattern of dots (or points). For example, the pattern module 602 may carry out block 102 of FIG. 1.

The greyscale module 604 is, in use of the processing circuitry 600, to determine a greyscale image of the dot pattern. In some examples, the greyscale image comprises a plurality of pixels each associated with a pixel greyscale value, and the greyscale module 604 is, in use of the processing circuitry 600, to determine, for each pixel, a distance between that pixel and the closest dot and to assign a greyscale value to the pixel based on the distance. For example, the greyscale module 604 may carry out any of blocks 104 to 112 of FIG. 1.

Figure 7:
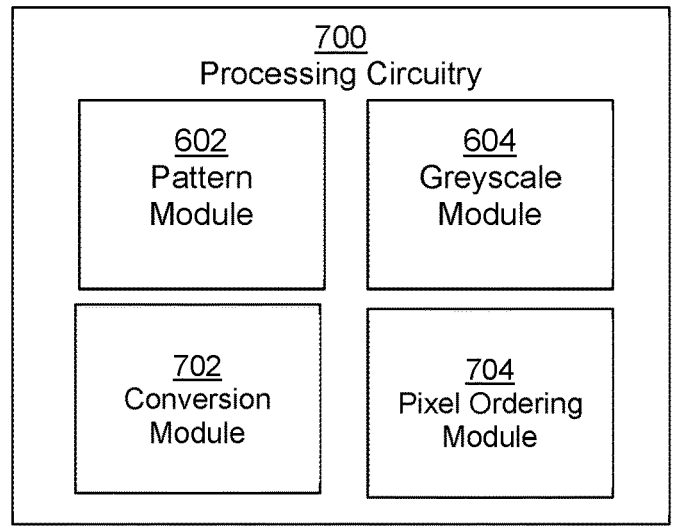

FIG. 7 is an example of processing circuitry 700 comprising the pattern module 602 and a greyscale module 604 described in relation to FIG. 7. The processing circuitry 700 further comprises a conversion module 702 and a pixel ordering module 704.

In use of the processing circuitry 700, the pixel ordering module 704 may operate on a greyscale image having a plurality of pixels, each pixel being associated with a grey level of a first number of grey levels, and determine a position of the pixel in a pixel order based on the grey levels. Where the pixels comprise sub-pixels, the grey level associated with each pixel may be the average of the grey levels of the pixels (which may be determined by the processing circuitry 700). This may index the pixels in order of increasing greyscale value, for example from lowest to highest. For example, the pixel ordering module 704 may carry out blocks 402 and/or 404 of FIG. 4 or blocks 502 and/or 504 of FIG. 5.

The greyscale module 604 is, in use of the processing circuitry 600, to determine a target number of grey levels, wherein the target number of grey levels is greater than the first number, and taking the pixels in pixel order, and the grey levels in order of magnitude (small to large), allocate a grey level to each pixel to provide the target number of grey levels For example, the greyscale module 604 may carry out any of blocks 406 to 416 of FIG. 4 or blocks 506 to 520 of FIG. 5. In some examples, the number of pixels per grey level may be the same. In other examples, the number of pixels per grey level may be the same after a threshold number of grey levels, wherein the threshold number is related to the intended print resolution (for example the lpi and dpi values, as set out above). In such examples, the number of pixels per grey level may not be a whole number, for example being a whole number of sub-pixels which is not equal to a multiple of the number of sub-pixels per pixel. In examples where the pixels of the greyscale image comprise sub-pixels, the greyscale module may determine a target number of sub-pixels per grey level based on the number of sub-pixels and an approximate target number of grey levels and allocate a grey level to each sub-pixel to provide, on average the target number of sub-pixels per grey level. As noted above, in some examples, below a threshold number, whole pixels may be allocated grey levels whereas above the threshold number (81 grey levels in the example above), one sub-pixel of a pixel may be allocated a first grey level while the next sub-pixel is allocated the next grey level.

The conversion module 702 is, in use of the processing circuitry 700, to convert the grey levels of pixels to a threshold of a halftone screen. Where the pixels comprise sub-pixels, the conversion module 606 may convert the grey levels of sub-pixels to a threshold of the halftone screen. For example, the conversion module 606 may carry out block 418 of FIG. 4 or block 522 of FIG. 5.

Figure 8:
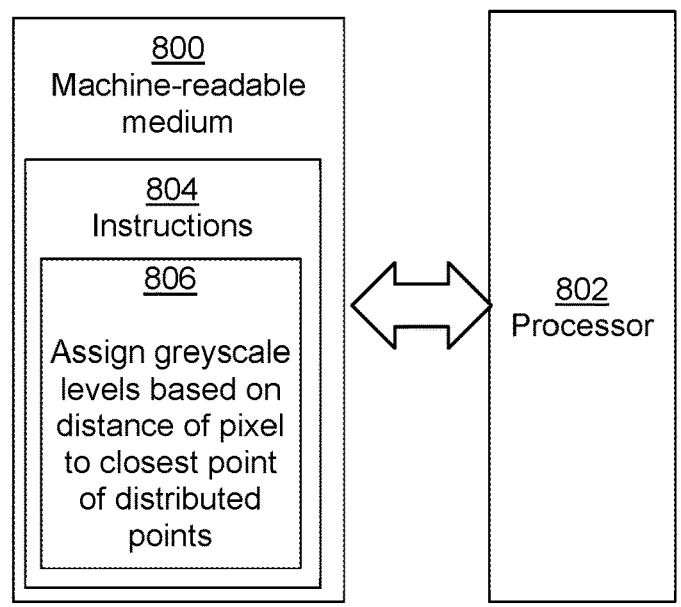
FIG. 8 is a representation of a computer readable medium associated with a processor.

FIG. 8 is an example of a non-transitory machine readable medium 800 associated with a processor 802. The machine readable medium 800 stores instructions 804 which, when executed, cause the processor 802 to carry out tasks.

In particular, the instructions 804 comprise instructions 806 which, when executed, cause the processor 802 to derive a greyscale image from an image comprising distributed points by assigning a greyscale level to each pixel which is proportional to a distance from the closest point to that pixel, wherein a pixel which has a closest point having a first distance is assigned a lower greyscale level than a pixel which has a closest point having a second distance, wherein the second distance is greater than the first distance. The distributed points may have any of the features of the dots of the dot patterns described above. The instructions 806 may comprise instructions to cause the processor 804 to assign greyscale levels in proportion to the distance.

In some examples, the instructions 806 further comprise instructions which, when executed, cause a processor to convert the greyscale image to a halftone threshold screen, for example using the methods set out above.

Examples in the present disclosure can be provided as methods, systems or machine readable instructions, such as any combination of software, hardware, firmware or the like. Such machine readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the block in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, or a module thereof, may execute the machine readable instructions. Thus functional modules of the processing circuitry 600, 700 (for example, matrix pattern module 602, greyscale module 604, conversion module 702 and/or the pixel ordering module 704) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising, by one or more processors:
acquiring a dot pattern having a distribution of dots;
deriving, from the dot pattern, a greyscale image comprising a plurality of pixels each associated with a greyscale value, wherein deriving the greyscale image comprises:
for each pixel, determining the closest dot to the pixel and associating a distance of the closest dot from the pixel with the pixel; and
assigning a greyscale value to each pixel, wherein the greyscale value is based on the distance associated with that pixel.

2. A method according to claim 1, wherein determining the dot pattern comprises tiling a plurality of repeating dot-pattern tiles.

3. A method according to claim 1, wherein assigning a greyscale value to each pixel comprises:
determining a range of distances and associating the maximum distance with the maximum assigned greyscale value; and
for each pixel, assigning greyscale values proportionally to the distance associated with the pixel.

4. A method according to claim 1 wherein assigning the greyscale value comprises assigning greyscale values between, and not including, a maximum and minimum greyscale value.

5. A method according to claim 1 which further comprises converting, by at least one processor, the greyscale image to a halftone screen comprising a matrix of threshold values.

6. A method according to claim 5 wherein converting the greyscale image to a halftone screen comprises:
determining an order of the pixels based on the greyscale value of each pixel;
determining a second number of grey levels, wherein the second number of grey levels is greater than the number of grey levels in the greyscale image;
determining an indication of a target number of pixels per grey level of the second number of grey levels; and
taking the pixels in the order, and based on the target number of pixels per grey level, allocating a new greyscale value to each pixel to provide the second number of grey levels.

7. A method according to claim 5 wherein converting the greyscale image to a halftone threshold matrix comprises:
determining pixels of the image, each pixel being at a predetermined print resolution and comprising a plurality of sub-pixels.

8. A method according to claim 7 comprising, by at least one processor:
determining an initial grey level for each pixel, the grey level being the average of the greyscale values of the sub-pixels of that pixel;
dividing the number of sub-pixels in the greyscale image by an estimate of the second number of grey levels to determine a target number of sub-pixels per grey level; and wherein allocating a new grey level to each pixel comprises allocating, on average, the target number of sub-pixels to each grey level.

9. Processing circuitry comprising:
a pattern module, to determine a dot pattern; and
a greyscale module to determine a greyscale image of the dot pattern, the greyscale image comprising a plurality of pixels each associated with a greyscale value, wherein the greyscale module is to determine, for each pixel, a distance between that pixel and the closest dot and to assign a greyscale value to the pixel based on the distance.

10. Processing circuitry according to claim 9 wherein the greyscale module is to determine a maximum distance for the plurality of pixels; and for each pixel, assign a greyscale value in proportion to the distance associated with the pixel compared to the maximum distance.

11. Processing circuitry according to claim 9 further comprising a conversion module to convert the greyscale values to thresholds in a halftone screen.

12. Processing circuitry according to claim 11 further comprising:
a pixel ordering module to, for the greyscale image having a plurality of pixels, each pixel being associated with a greyscale value which is a grey level of a first number of grey levels, determine a position of the pixel in a pixel order based on the grey levels wherein pixels having the same grey level are grouped in the pixel order; and wherein
the greyscale module is to:
determine a target number of grey levels, wherein the target number of grey levels is greater than the first number, and
taking the pixels in pixel order and the grey levels of the target number of grey levels in grey level order, allocate a grey level to each pixel to provide the target number of grey levels, distributing the pixels between the grey levels.

13. Non-transitory machine readable medium storing instructions which, when executed, cause a processor to:
derive a greyscale image from an image comprising distributed points by assigning a greyscale level to each pixel which is proportional to a distance from the closest point to that pixel, wherein a pixel which has a closest point having a first distance is assigned a lower greyscale level than a pixel which has a closest point having a second distance, wherein the second distance is greater than the first distance.

14. Non-transitory machine readable medium according to claim 13, further storing instructions which, when executed, cause a processor to assign greyscale levels in proportion to the distance.

15. Non-transitory machine readable medium according to claim 13, further storing instructions which, when executed, cause a processor to convert the greyscale image to a halftone threshold screen.

* * * * *